United States Patent
Gordon et al.

(10) Patent No.: US 10,284,492 B2
(45) Date of Patent: May 7, 2019

(54) CONTROL OF CASTING TO A MEDIA RENDERER

(71) Applicant: Microsoft Technology Licensing, LLC, Redmond, WA (US)

(72) Inventors: Ariel Gordon, Kirkland, WA (US); Steven James Ball, Redmond, WA (US); Benjamin Richard Vincent, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 228 days.

(21) Appl. No.: 15/233,883

(22) Filed: Aug. 10, 2016

(65) Prior Publication Data

US 2018/0048590 A1 Feb. 15, 2018

(51) Int. Cl.
*H04L 12/927* (2013.01)
*H04W 4/80* (2018.01)
*H04L 12/911* (2013.01)
*H04L 29/06* (2006.01)
*H04N 21/41* (2011.01)
(Continued)

(52) U.S. Cl.
CPC .......... *H04L 47/808* (2013.01); *H04L 47/829* (2013.01); *H04L 63/10* (2013.01); *H04L 65/4076* (2013.01); *H04N 21/4122* (2013.01); *H04N 21/41407* (2013.01); *H04W 4/80* (2018.02); *H04W 4/33* (2018.02)

(58) Field of Classification Search
CPC .......... G06F 17/2247; G06F 17/30905; G06F 21/10; G06Q 10/101; G06T 11/60; G11B 20/1052; H04L 63/062; H04L 63/0853; H04L 47/808; H04L 47/829; H04L 63/10; H04L 65/4076; H04N 21/4122; H04N 21/41407
See application file for complete search history.

(56) References Cited

U.S. PATENT DOCUMENTS

| | | |
|---|---|---|
| 7,689,920 B2 | 3/2010 | Robbin et al. |
| 8,793,719 B2 | 7/2014 | Cho |
| 8,819,268 B1 | 8/2014 | Sauer |

(Continued)

FOREIGN PATENT DOCUMENTS

WO  2016076587 A1  5/2016

OTHER PUBLICATIONS

"International Search Report and Written Opinion Issued in PCT Application No. PCT/US2017/045396", dated Sep. 22, 2017, 12 Pages.

(Continued)

*Primary Examiner* — Le H Luu
(74) *Attorney, Agent, or Firm* — Mannava & Kang, P.C.

(57) ABSTRACT

A method and system for controlling casting to a media renderer is provided. A casting control system receives from a requesting device a request to cast media to the media renderer. In response to receiving the request, the casting control system identifies a gatekeeper for the media renderer and notifies the gatekeeper that a request has been received to cast media to the media renderer. After the casting control system receives from the gatekeeper an indication to grant or deny the request, the casting control system allows or denies the casting of the media to the media renderer.

23 Claims, 6 Drawing Sheets

(51) Int. Cl.
*H04N 21/414* (2011.01)
*H04W 4/33* (2018.01)

(56) References Cited

U.S. PATENT DOCUMENTS

| | | | |
|---|---|---|---|
| 9,226,137 B2 | 12/2015 | Anantharaman et al. | |
| 2003/0079133 A1* | 4/2003 | Breiter | G06F 21/10 |
| | | | 713/182 |
| 2007/0150918 A1 | 6/2007 | Carpenter et al. | |
| 2008/0117339 A1 | 5/2008 | Kirsche | |
| 2009/0122787 A1* | 5/2009 | Huotari | H04L 63/0853 |
| | | | 370/352 |
| 2011/0107238 A1* | 5/2011 | Liu | G06Q 10/101 |
| | | | 715/756 |
| 2011/0185399 A1 | 7/2011 | Webber et al. | |
| 2011/0314392 A1 | 12/2011 | Howarth | |
| 2012/0117585 A1* | 5/2012 | Curtis | G11B 20/10527 |
| | | | 725/25 |
| 2012/0227066 A1* | 9/2012 | Woxblom | G06F 21/10 |
| | | | 725/25 |
| 2012/0324584 A1* | 12/2012 | Al-Shaykh | G06F 17/30905 |
| | | | 726/26 |
| 2013/0125212 A1 | 5/2013 | Lee | |
| 2013/0148720 A1 | 6/2013 | Rabii | |
| 2014/0173507 A1* | 6/2014 | Demeyere | G06T 11/60 |
| | | | 715/789 |
| 2014/0283137 A1* | 9/2014 | Rebaud | G06F 21/10 |
| | | | 726/29 |
| 2014/0344897 A1* | 11/2014 | Cholas | H04L 63/062 |
| | | | 726/4 |
| 2015/0089668 A1 | 3/2015 | Baldwin et al. | |
| 2016/0048485 A1* | 2/2016 | Sherwood | G06F 17/2247 |
| | | | 715/234 |
| 2016/0092154 A1 | 3/2016 | Bourlier et al. | |

OTHER PUBLICATIONS

"AT&T Smart Controls," Retrieved on: May 17, 2016, Available at.
Hildenbrand, Jerry, "How to set a Priority Device in Google OnHub," Published on: Dec. 19, 2015, Available at: http://www.androidcentral.com/how-set-priority-device-google-onhub.
"Guest mode PIN," Published on: Sep. 26, 2015, Available at: https://support.google.com/chromecast/answer/6100251.
"Use Restrictions on your Apple TV," Retrieved on: May 17, 2016, Available at: https://support.apple.com/en-us/HT200198.
"The evolution of access control: from VPN to identity-based anywhere access," Published on: Apr. 11, 2016, Available at: https://blogs.technet.microsoft.com/microsoftintune/2016/04/11/the-evolution-of-access-control-from-vpn-to-identity-based-anywhere-access/.
"How to block kids tablets from casting youtube to my tv?!?!," Retrieved on: May 23, 2016, Available at: https://m.reddit.com/r/Chromecast/comments/2ul3b1/how_to_block_kids_tablets_from_casting_youtube_to/.

* cited by examiner

CONTROL OF CASTING TO A MEDIA RENDERER

BACKGROUND

The casting of media to media renderers (e.g., televisions, monitors, and music players) is becoming increasing popular. "Casting" refers to a technique in which a device (e.g., smartphone or tablet) discovers media renderers and then transmits (e.g., wirelessly) media to a discovered media renderer. In some cases, the device discovers media renderers that are part of the same network to which the device is connected by multicasting a discovery request through the network. In other cases, the device may discover media renderers based on proximity to the media renderers, for example, using Bluetooth technology. Many media renderers are casting-enabled or may be made casting-enabled by attaching a casting device to one of their inputs (e.g., the HDMI port of a television).

Casting can be used to transmit various types of media. For example, a tablet that is currently playing a video may cast that video to a media renderer such as a television. As another example, a smartphone that is being streamed music can cast the music to a music player, mobile speakers, a car, or possibly a television. As another example, a desktop computer can cast the content of its display or a window of the display to a media renderer.

The use of casting has simplified the sharing of media renderers. For example, many meeting rooms come equipped with audiovisual systems. Prior to casting, a person who wanted to display information on a media renderer in a meeting room would need to physically connect their device (e.g., laptop) to a cable connected to the media renderer. A meeting room may provide many different types of connectors (e.g., HDMI, USB, and RCA) and/or adapters to accommodate the different type of connectors supported by media renderers and devices. The switching from the connecting of the media renderer from one person's device to another person's device is often cumbersome because cables need to be physically disconnected and connected and the compatible connectors need to be identified.

Although casting has simplified the sharing of media renderers, it has the disadvantage that whenever a device casts media to a media renderer, the media is immediately rendered by the media renderer. For example, in a classroom setting, a teacher may direct a student to cast a presentation to a display in front of the classroom. If another student were inadvertently or intentionally to cast a video to the display, the video would immediately replace the presentation. As another example, someone in an adjacent classroom might cast their media to the display in the other classroom, thinking that the display was in their classroom.

SUMMARY

A method and system for controlling casting to a media renderer is provided. In some embodiments, a casting control system receives from a requesting device a request to cast media to the media renderer. In response to receiving the request, the casting control system identifies a gatekeeper for the media renderer and notifies the gatekeeper that a request has been received to cast media to the media renderer. After the casting control system receives from the gatekeeper an indication to grant or deny the request, the casting control system allows or denies the casting of the media to the media renderer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
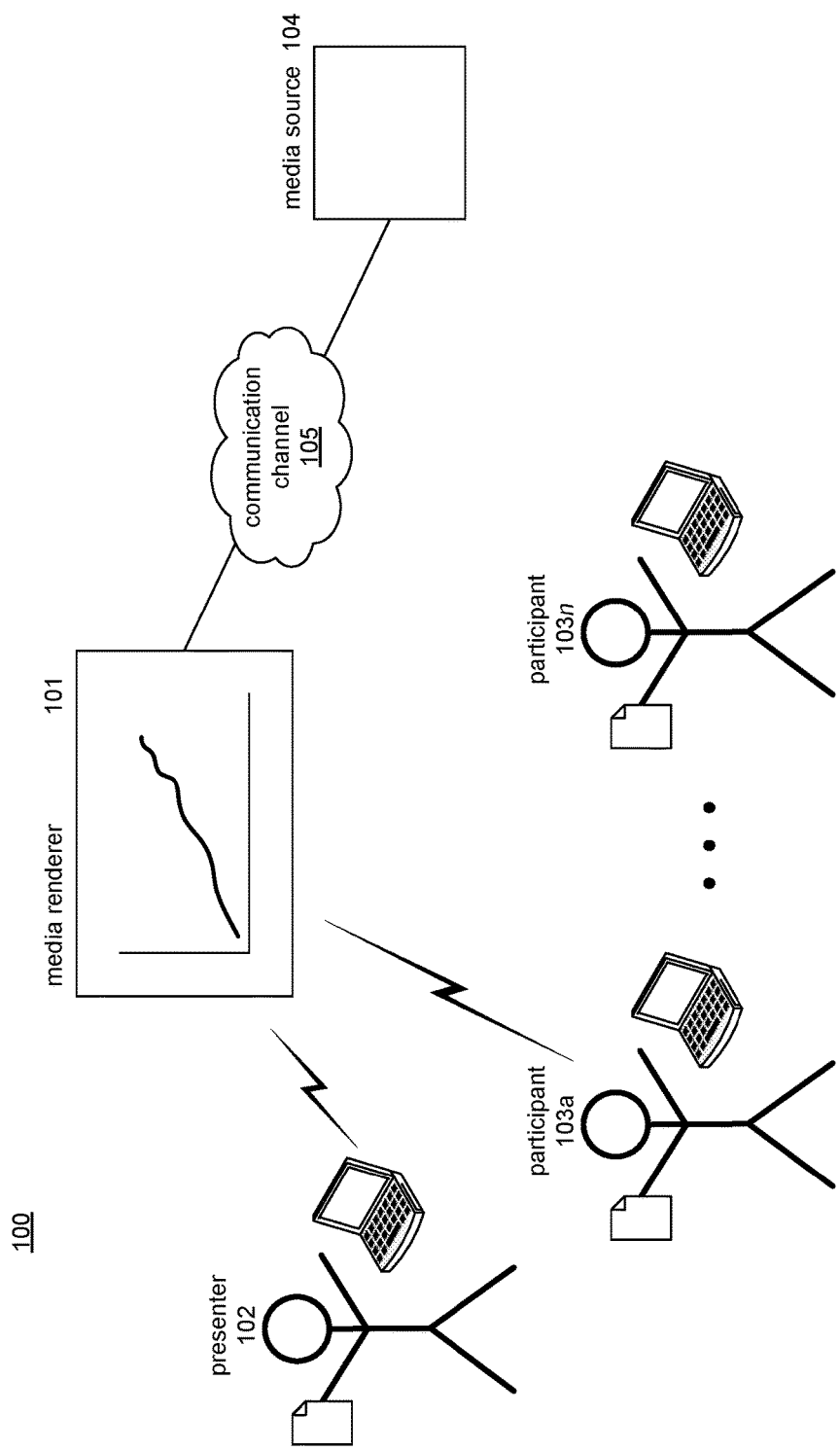
FIG. 1 is a diagram illustrating use of a casting control system in some embodiments.

A method and system for controlling casting to a media renderer is provided. In some embodiments, a casting control system receives a request to cast to a media renderer and seeks permission from a gatekeeper of access to the media renderer. For example, in a home environment, a parent may be the gatekeeper for the television in the home. When a child requests to cast from their tablet to a television, the casting control system may send a notification via text message to a parent seeking permission to allow the child to cast to the television. If the gatekeeper responds by granting permission, then the requested casting is allowed and the transmitted (e.g., streamed) media is rendered by the media renderer. For example, when the parent sends a reply text message indicating that permission is granted, the media transmitted from the child's laptop to the media renderer is rendered by the media renderer. In this way, the casting control system prevents casting of media without the permission of a gatekeeper to prevent unauthorized casting of media and to prevent intentional or unintentional replacement of the media currently being cast to a media renderer.

In some embodiments, the casting control system, a portion of which may be located at a media renderer, receives from a requesting device a request to cast media to a media renderer. For example, after the requesting device discovers the media renderer, it sends a request message to the media renderer seeking permission to cast. In response to receiving the request, the casting control system identifies a gatekeeper for the media renderer. The gatekeeper for the media renderer may be a person who is predefined or who is selected based on the current time, the requesting device, the requester (e.g., a child or a household guest), and so on. For example, in a home environment, the gatekeeper may be predefined as one parent or either of two parents. In an assembly environment (e.g., classroom or conference room), the gatekeeper may be the person in control of the assembly scheduled for the current time. In the case of a classroom, the gatekeeper for a television in the classroom may be the teacher of the class that is in the classroom as indicated by a schedule of classes. In the case of a conference room, the gatekeeper for a display in the conference room may be the organizer of the meeting that is being conducted in the conference room as indicated by a conference room schedule. In some cases, the gatekeeper for a media renderer may be a superordinate of the person whose device is requesting to cast. For example, when a television is located in a common area of an office building (e.g., cafeteria), the gatekeeper for the television may be a manager of the person whose device is requesting to cast to the television. The casting control system may be used to coordinate the casting of media during various gatherings of two or more people, such as a class, a meeting, a party, a conference, a sporting event, and so on.

In some embodiments, a media renderer may have multiple gatekeepers. For example, in a home environment, the gatekeepers for a television may be the parents. In such a case, the casting control system may first send a request to a parent who is designated as the primary parent. If the primary parent does not respond (e.g., within a certain time period), the casting control system then sends the request to the other parent. In this way, the casting control system provides a fallback if a primary gatekeeper cannot be reached. Alternatively, the casting control system may send the request to both parents and use the first response that is received.

In some embodiments, once the gatekeeper for a device is identified, the casting control system notifies the gatekeeper that a request has been received to cast media to the media renderer. The casting control system may identify one or more devices of the gatekeeper by accessing a database mapping people to their devices. The casting control system may send the request to one or more of the devices. The casting control system may also access a presence server to identify the currently most active device of the gatekeeper and send the request to that identified device. The request may be sent to a specific device (e.g., via a text message) or to no specific device (e.g., via email). The request identifies the person who controls (e.g., owns) the requesting device and the media renderer. The request may also identify the media and include information on who is currently casting to the media renderer. Upon receiving the notification, the gatekeeper responds by granting or denying permission to cast.

In some embodiments, when the casting control system receives the response from the gatekeeper granting permission, the casting control system may send a response to the requesting device indicating that transmission of the media can proceed. Alternatively, if the media was already being transmitted, but not rendered by the media renderer, the casting control system may direct the rendering of the media. If permission is denied, the casting control system may send to the requesting device a response indicating the denial or may simply not respond. If no response is received from the gatekeeper after a certain time period, the casting control system may grant or deny permission based on various factors, such as whether another device is currently casting to the media renderer, a setting indicating that the default is to grant or deny, and so on. In some embodiments, the casting control system may allow a requesting device to appeal a denial to a higher authority, such as a supervisor of the identified gatekeeper. In such case, the higher authority would be given an opportunity to grant or deny permission. In some embodiments, if other media is currently being cast to the media renderer, then the casting of that other media may be stopped so that the casting of the media can start. In some instances, when the casting of the media completes, the casting of the other media may resume. Alternatively, the start of the casting of the media may be delayed until the casting of the current media finishes. As another alternative, the casting of the current media may continue simultaneously with the casting of the media. In such a case, the current media and the media may be mixed when rendered. For example, if the current media is music and the media is an announcement, the volume of the current media may be reduced while the announcement is rendered. As another example, the current media may be a television program and the media may be closed-captioned text, such as editorial comment or transcription or translation of the television program. As another example, during a music party, the person who acts as the gatekeeper to the music renderer may cast announcements, which are mixed with the current music, to inform the partiers of who is casting the current music.

In some embodiments, the casting control system identifies various attributes associated with a request and identifies a gatekeeper based on one or more of those attributes. The attributes may include the identification of the media renderer, the identification of the requesting device, the current time, and so on. For example, the identification of the media renderer and the current time may be used to identify the classroom in which the media renderer is located and the class that is scheduled for the identified classroom at the current time. The casting control system can then select the teacher of that class as the gatekeeper. As another example, the identification of the requesting device may be used to identify the person who owns the requesting device. The casting control system can then select that person's supervisor as the gatekeeper. The supervisor may be identified from an organization chart that is represented by a relationship graph. Another attribute may be which device is currently connected to the media renderer. For example, the sound system of a vehicle may be automatically connected to a smartphone, such as the driver's smartphone, based on a prior pairing between the sound system and the smartphone. In such case, when a passenger's device requests to cast to the sound system, the casting control system may identify the driver as the gatekeeper.

In some embodiments, the gatekeeper, instead of being a person, may be a gatekeeper engine that enforces a policy for casting media. For example, a policy for a home environment may indicate to automatically deny permission for requests received from children during certain times of day. As another example, the policy for a certain media renderer may indicate to automatically grant permission for requests from certain requesters but seek permission from a gatekeeper for other requesters.

In some embodiments, the requesting device may be the source of the media, and the media is transmitted from the requesting device to the media renderer. Alternatively, the source of the media may be another device, such as a media server. In such a case, the requesting device may notify the media renderer of the source and the media renderer establishes a connection with the source and receives the media from the source.

In some embodiments, the casting control system detects an attempt by a device to cast to the media renderer and considers that attempt as a request to cast to the device. In response to detecting the attempt, if another device is not currently casting to the media renderer, the casting control system may automatically allow the device to cast to the media renderer. If, however, another device is currently casting to the media renderer, the casting control system identifies a gatekeeper and seeks permission from the gatekeeper to allow the attempted casting. If the casting is allowed, the casting control system allows the device to cast to the media renderer even if another device is currently casting to the media renderer.

In some embodiments, the casting control system may be used to control casting to a media renderer during a media party. If the party is being held at a home, then the homeowner may be the gatekeeper for all media renderers in the home. When a device of a partier requests to cast to a media renderer, the homeowner is notified and can grant or deny permission. In some cases, the casting control system may queue the requests so that when the casting of the media associated with one request stops, the casting of the media associated with the next request in the queue may start. Such a queue may also be used to queue music for a media renderer that is a jukebox, in which, for example, patrons of a pub cast their media to the jukebox.

In some embodiments, a requesting device may request to cast to multiple media renderers. In such a case, the casting control system associated with each media renderer identifies the gatekeeper for that media renderer and seeks permission from that gatekeeper. For example, a principal of a school may need to send an important video message to each student's computer. The principal's requesting device may send to each student's computer a request to cast. Upon receiving a request, the casting control system of a student's computer identifies the student as the gatekeeper and sends a request, for example, by text message seeking permission to cast to the student's computer. Upon receiving a grant of permission to cast, the casting control system of the student's computer notifies the requesting device that permission has been granted.

In some embodiments, the casting control system may be used in a large conference room to avoid having a microphone that is shared by conference participants who want to speak to the conference. Typically, participants who want to speak are handed a portable microphone in turn by a facilitator who moves about the room from one speaker's location to the next. Alternatively, participants who want to speak walk over to a microphone at a fixed location to queue up for their turn to speak. The casting control system allows each participant's smartphone to be used as a microphone to cast their voice to the sound system of the conference room. When the casting control system receives a request to cast from a smartphone of a participant, it identifies a facilitator of the conference as the gatekeeper and seeks permission from the facilitator to allow that smartphone to cast. The facilitator can grant or deny permission in the order received or may grant or deny permission in a different order. For example, when one participant comments on another participant, that other participant may be granted permission to cast despite not being next in the queue of requests.

FIG. 1 is a diagram illustrating use of a casting control system in some embodiments. A conference room 100 includes a media renderer 101 that is currently displaying media that is being cast to the media renderer. A presenter participant 102 and participants 103 are participating in the conference in the conference room. Each participant may have a laptop and a smartphone. The media renderer is connected to a media source 104 via a communications channel 105, such as the Internet. Participant 103a may be currently casting media from their laptop to the media renderer. Participant 103n may send to the casting control system of the media renderer a request via a smartphone to cast to the media renderer. Upon receiving the requests, the casting control system identifies the presenter participant as the gatekeeper for the media renderer and sends a notification to the smartphone of the presenter participant. When the presenter participant grants permission, the casting control system notifies the laptop of participant 103a to stop transmitting media to the media renderer and the smartphone of participant 103n to start transmitting media to the media renderer. Alternatively, the casting control system may not notify the laptop of participant 103a, but rather just stop receiving the transmission from that laptop. If the request from participant 103n indicates that the media was to be transmitted from the media source 104 rather than the smartphone of participant 103n, the media renderer establishes a connection with the media source and starts receiving media from the media source.

Figure 2:
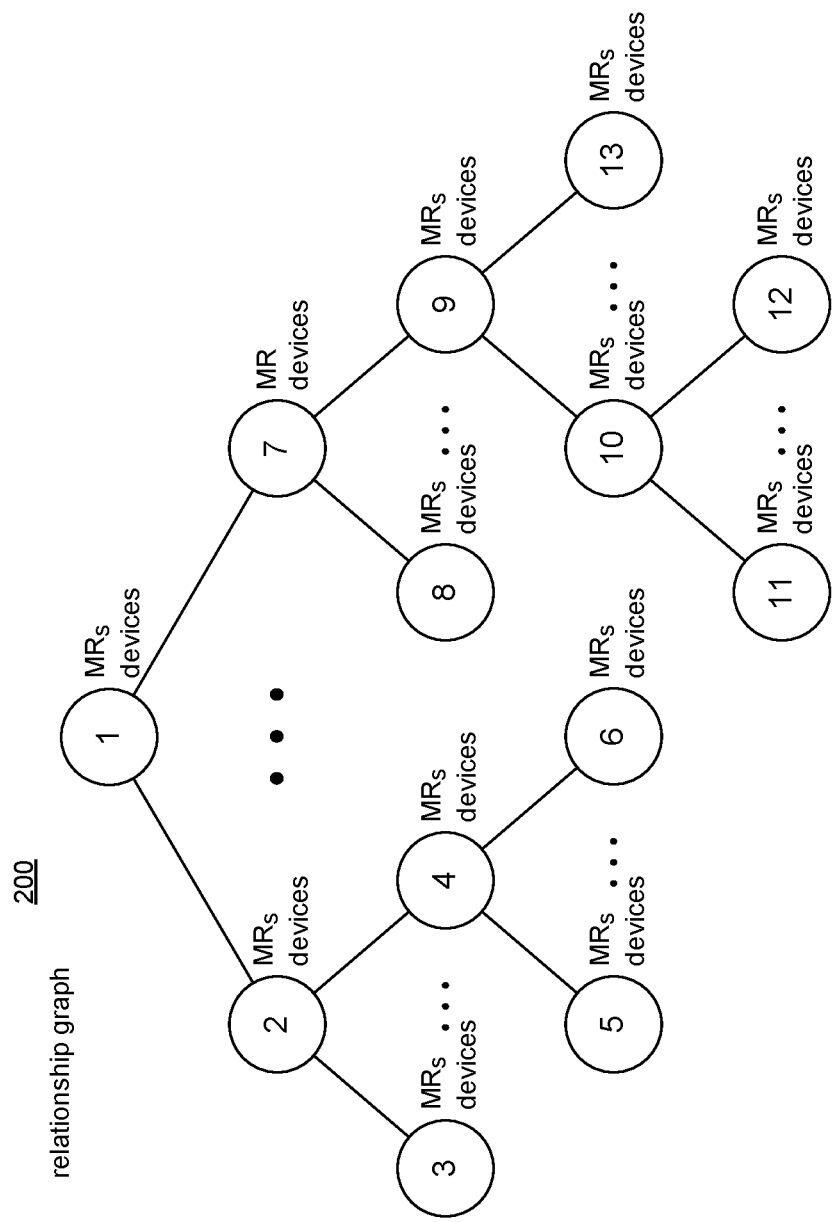
FIG. 2 is a relationship graph that defines superordinate and subordinate relationships between various people.

FIG. 2 is a relationship graph that defines superordinate and subordinate relationships between various people. A relationship graph 200 includes circles representing people and the lines between the circles representing relationships. For example, circle 1 represents person 1 and circle 2 represents person 2. The line between the circles indicates that person 2 is a subordinate of person 1. The relationship graph may be represented in a data structure that further maps each person to their devices and possibly to their media renderers. For example, person 1 may be mapped to their smartphone, laptop, and desktop and to a television in a meeting room that is permanently reserved for person 1. In some embodiments, the relationship graph may indicate which people can act as gatekeepers. For example, persons 1, 2, and 7 may be designated as permanent gatekeepers for the television in the meeting room. If person 13 requests to cast to the television, the casting control system may traverse the relationship graph to identify the closest superordinate to person 13 who has been designated as a gatekeeper. Since person 7 is the closest superordinate who has been designated as a gatekeeper for the television, the casting control system identifies person 7 as the gatekeeper. If person 7 is not available, then the casting control system may identify person 1 as the gatekeeper. Alternatively, the casting control system may identify the farthest superordinate to person 13, that is, person 1, as the gatekeeper and then identify person 7 as the gatekeeper if person 1 is unavailable.

Figure 3:
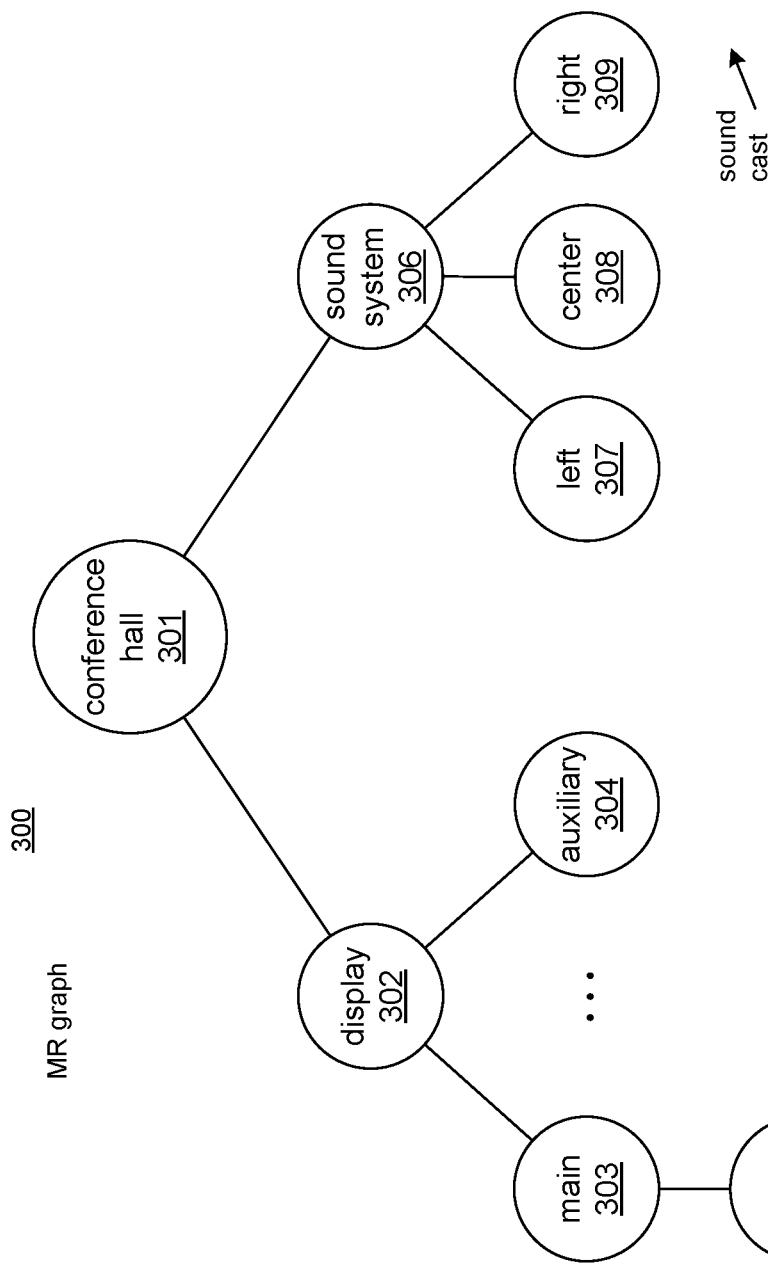
FIG. 3 is a media renderer graph that defines a hierarchy of media renderers in a large conference hall in some examples.

FIG. 3 is a media renderer graph that defines a hierarchy of media renderers in a large conference hall in some examples. The conference hall may include a main display at the front of the conference hall and auxiliary displays at the side of the conference hall. The conference hall may also include a sound system with various speakers. A media renderer graph 300 includes circles 301-309 that represent media renderers and logical media renderers. A logical media renderer represents a collection of media renderers. For example, circle 301 represents a logical media renderer that represents all the media renderers in the conference hall. Circle 302 represents a logical media renderer that represents all the displays in the conference hall, and circles 303-304 represent the main display and various auxiliary displays. Circle 305 represents a picture-in-picture media renderer of the main display. Circle 306 represents the sound system of the conference hall, and circles 307-309 represent various speakers of the sound system. Each of the media renderers may have a corresponding casting control system, or a single casting control system may be used to control access to the various media renderers. Each of the media renderers, including the logical media renderers, may be discoverable by requesting devices. For example, a person who wants to deliver a presentation using all the media renderers in the conference hall may request to cast to the conference hall media renderer. If permission is granted by the gatekeeper for the conference hall media renderer, the casting control system may notify each of the media renderers in the conference hall to accept the cast of that person. As another example, a person may request that the presentation be cast to the main display media renderer and to the sound system media renderer. If permission is granted by the gatekeeper of the media renderers, the person's device can then start casting the media to the main display and the sound system. Another person may then request that their presentation be cast to one or more of the auxiliary displays.

Figure 4:
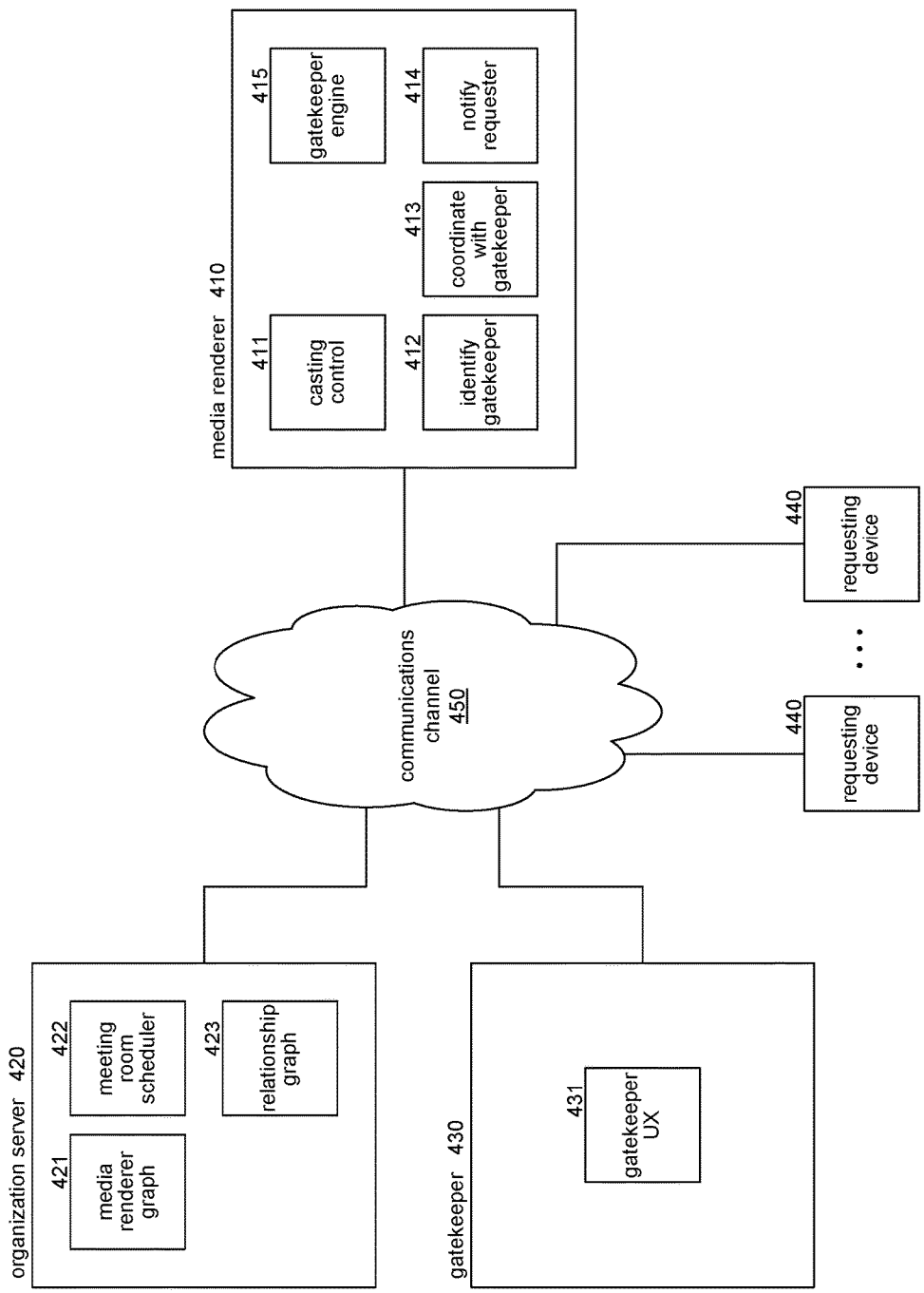
FIG. 4 is a block diagram that illustrates components used by a casting control system in some embodiments.

FIG. 4 is a block diagram that illustrates components used by a casting control system in some embodiments. A media renderer 410 may be connected to an organization server 420, a gatekeeper device 430, and requesting devices 440 via communications channel 450. The connections may be wired or wireless. The media renderer includes a casting control component 411, an identify gatekeeper component 412, a coordinate with gatekeeper component 413, a notify requester component 414, and a gatekeeper engine 415. The casting control component receives requests from the requesting devices to cast to the media renderer, identifies a gatekeeper, coordinates with the gatekeeper, and then notifies the requester whether permission is granted or denied. The identify gatekeeper component may interface with a media renderer graph 421, a meeting room scheduler 422, and a relationship graph 423 of the organization server of an organization (e.g., a company) to identify gatekeepers. The coordinate with gatekeeper component interfaces with a gatekeeper user experience component 431 of the gatekeeper device to seek permission to cast to the media renderer. The notify requester component notifies the requesting devices when permission has been granted or denied. The gatekeeper engine may function as a gatekeeper that enforces a policy of the organization relating to casting to media renderers without having to request permission of a gatekeeper who is a person. The casting control system thus provides a technical solution to the technical problem of each new cast preempting any current cast. The technical solution prevents preemption (at least without permission) by dynamically identifying a gatekeeper for a media renderer based on various attributes. The technical solution provides control to an otherwise uncontrolled casting, but still allows the many advantages of casting.

The computing systems on which the casting control system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems of requesting devices may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the casting control system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The casting control system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the casting control system may be implemented in hardware using, for example, an application-specific integrated circuit (ASIC).

Figure 5:
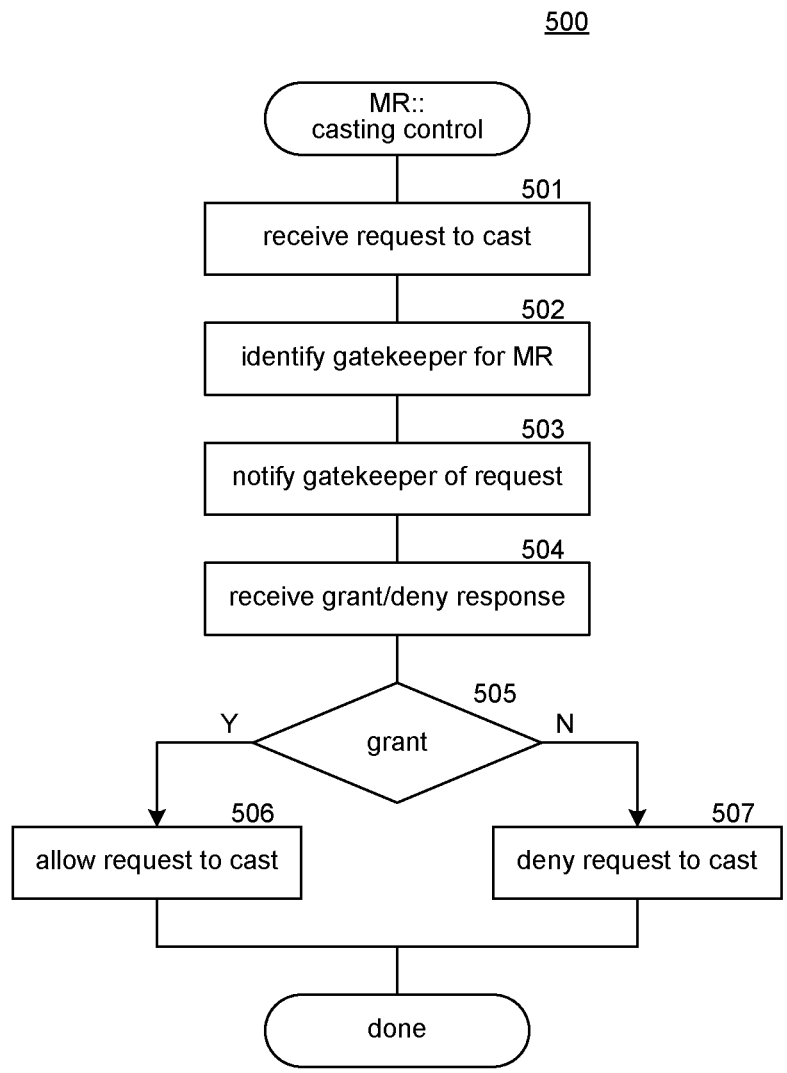
FIG. 5 is a flow diagram that illustrates processing of a casting control component of a media renderer in some embodiments.

FIG. 5 is a flow diagram that illustrates processing of a casting control component of a media renderer in some embodiments. A casting control component 500 processes requests to cast to a media renderer. In block 501, the component receives a request to cast to the media renderer from a requesting device. In block 502, the component identifies a gatekeeper for the media renderer, for example, based on various attributes associated with the request. For example, the component may invoke the identify gatekeeper component 412. In block 503, the component notifies the gatekeeper of the request, and in block 504, the component receives the response from the gatekeeper. For example, the component may invoke the coordinate with gatekeeper component 413. In decision block 505, if the response indicates that permission is granted, then the component allows the request to cast in block 506 and then completes, else the component denies the request to cast in block 507 and then completes.

Figure 6:
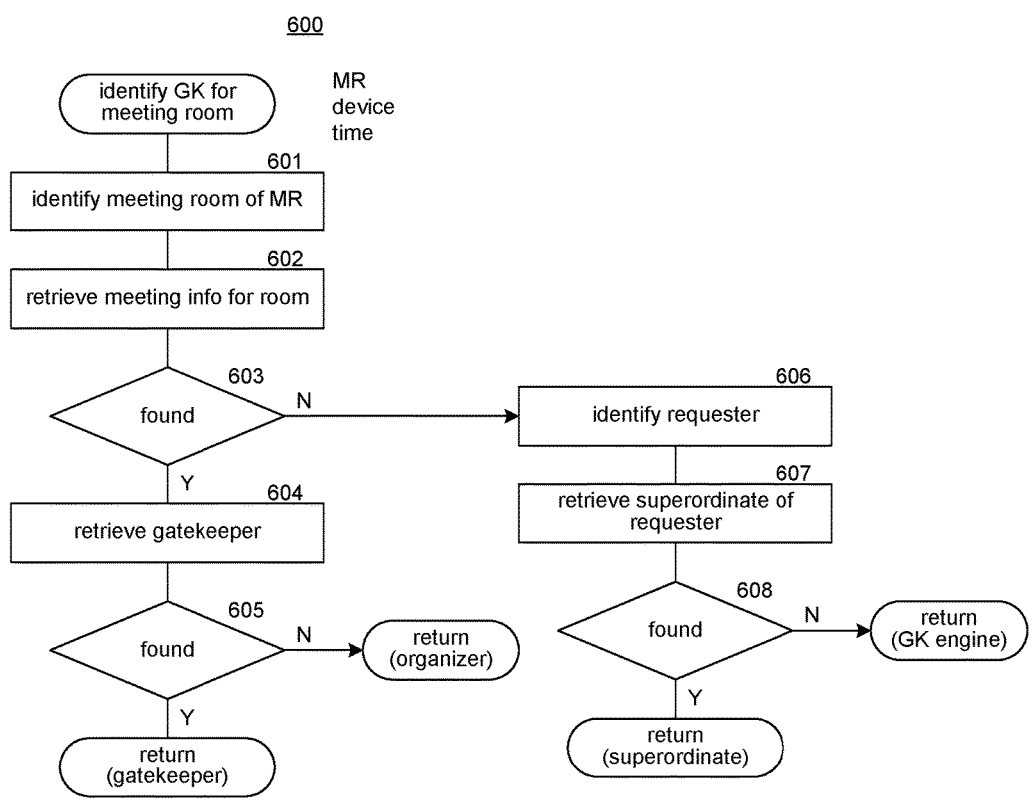
FIG. 6 is a flow diagram that illustrates the processing of an identify gatekeeper for meeting room component in some embodiments.

FIG. 6 is a flow diagram that illustrates the processing of an identify gatekeeper for meeting room component in some embodiments. An identify gatekeeper for meeting room component 600 may be passed an indication of a media renderer, a requesting device, and the current time and identify a gatekeeper based on the media renderer, the requesting device, and the current time. In block 601, the component identifies a meeting room that the media renderer is located in. In block 602, the component retrieves the meeting information for the identified meeting room for the current time. The meeting information may identify the gatekeeper, organizer, main presenter, and participants of the meeting. In decision block 603, if the meeting information has been found (e.g., a meeting is scheduled for the current time), then the component continues at block 604, else the component continues at block 606. In block 604, the component retrieves the identification of the gatekeeper from the meeting information. In decision block 605, if a gatekeeper has been identified, then the component returns an indication of the gatekeeper, else the component returns an indication of the organizer as the default gatekeeper. In block 606, the component identifies the requester. For example, the component may access a mapping of devices to people who control those devices. In block 607, the component may retrieve an indication of the superordinate of the requester from the relationship graph. In decision block 608, if the superordinate is found, then the component returns an indication of the superordinate, else the component may return an indication of the gatekeeper engine. If the gatekeeper engine is returned, the casting control system then invokes the gatekeeper engine to determine whether to grant or deny the request.

The following paragraphs describe various embodiments of aspects of the casting control system. An implementation of the casting control system may employ any combination of the embodiments. The processing described below may be performed by a computing device with a processor that executes computer-executable instructions stored on a computer-readable storage medium that implements the casting control system.

A method performed by a computing device for controlling casting of media to a media renderer is provided. The method receives receiving from a requesting device a request to cast media to the media renderer. In response to receiving the request, the method identifies a gatekeeper for the media renderer. The method notifies the gatekeeper that the request has been received. The method receives from the gatekeeper an indication to grant or deny the request. When the request is granted, the method allows the media to be cast to the media renderer as requested. When the request is denied, the method does not allow the media to be cast to the media renderer. In some embodiments, the method further identifies one or more attributes associated with the request that are selected from a group consisting of an identification of the media renderer, an identification of a requester, an identification of the requesting device, a location of the requesting device, a location of the media to be rendered, and a current time, and wherein the gatekeeper is identified based on the identified one or more attributes. In some embodiments, when an attribute is the identification of the requester, the gatekeeper is identified based on a superordinate and subordinate relationship between the gatekeeper and the requester. In some embodiments, the superordinate and subordinate relationship is specified in a relationship graph. In some embodiments, the superordinate and subordinate relationship between an organizer of a gathering and attendees of the gathering. In some embodiments, the superordinate and subordinate relationship is a teacher and student relationship. In some embodiments, the superordinate and subordinate relationship is a parent and child relationship. In some embodiments, the superordinate and subordinate relationship is a relationship between a driver of a vehicle and a passenger in the vehicle. In some embodiments, when an attribute is the current time and the media renderer is located in an assembly room, the gatekeeper is identified based on an assembly scheduled for the assembly room at the current time. In some embodiments, when an attribute is the identification of the requesting device, the gatekeeper is identified based on a person in control of the requesting device. In some embodiments, the gatekeeper is a person and the notification is sent to a device associated with that person. In some embodiments, the gatekeeper is a gatekeeper engine that enforces a policy for casting media to the media renderer. In some embodiments, when current media is being cast to the media renderer when the request is received, the allowing of the media to be cast results in the casting of the current media to be stopped and the casting of the media to be started. In some embodiments, when current media is currently being cast to the media renderer when the request is received, the request is queued so that the media can be cast after the casting of the current media stops. In some embodiments, the requesting device is the source of the media to be cast. In some embodiments, a device other than the requesting device is the source of the media to be cast. In some embodiments, when current media is currently being cast to the media renderer when the request is granted, the current media and the media are mixed and the mixed media is rendered. In some embodiments, the media is an announcement that is mixed with the current media. In some embodiments, when an indication to grant or deny the request is not received from the gatekeeper, notifying another gatekeeper that the request has been received.

A casting control system that comprises one or more computer-readable storage media storing computer-executable instructions and a processor for executing the computer-executable instructions stored by the one or more computer-readable storage media. The instructions include instructions for receiving from a requesting device a request to cast to a media renderer. The instructions include instructions for in response to receiving the request, identifying a gatekeeper for the media renderer, coordinating with the gatekeeper to determine whether to allow or deny the request, and allowing or not allowing the casting based on the determination. In some embodiments, the instructions include instructions for, when a current device is currently casting to the media renderer and the requested casting is allowed, terminating the casting of the current device. In some embodiments, the instructions include instructions for identifying a gatekeeper identify different gatekeepers for the media renderer based on the current time, the requesting device, and a requester associated with the requesting device.

One or more computer-readable storage media storing computer-executable instructions that, when executed by a processor, cause a media renderer to perform actions is provided. The actions include detecting an attempt by a device to cast to the media renderer. The actions further include in response to detecting the attempt, if another device is not currently casting to the media renderer, allowing the device to cast to the media renderer. The actions further include in response to detecting the attempt, if another device is currently casting to the media renderer, identifying a gatekeeper for the media renderer; notifying the gatekeeper that an attempt has been received to cast to the media renderer; receiving from the gatekeeper an indication to grant or deny the casting; when the casting is granted, allowing the device to cast to the media renderer even if another device is currently casting to the media renderer; and when the casting is denied, not allowing the device to cast to the media renderer.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing device for controlling casting of media to a media renderer, the method comprising:
 receiving from a requesting device a request to cast media to the media renderer;
 in response to receiving the request,
  identifying one or more attributes associated with the request;
  based on the identified one or more attributes associated with the request,
  identifying a gatekeeper from a plurality of different gatekeepers for the media renderer;
   notifying the identified gatekeeper that the request has been received;
   receiving from the identified gatekeeper an indication to grant or deny the request;
   when the request is granted, allowing the media to be cast to the media renderer as requested; and when the request is denied, not allowing the media to be cast to the media renderer.

2. The method of claim 1, wherein the one or more attributes associated with the request are selected from a group consisting of an identification of the media renderer, an identification of a requester, an identification of the requesting device, a location of the requesting device, a location of the media to be rendered, and a current time, and wherein identifying the gatekeeper comprises identifying the gatekeeper from the plurality of different gatekeepers based on the identified one or more attributes.

3. The method of claim 2, wherein the identified one or more attributes is the identification of the requester and based on the attribute being the identification of the requester, identifying the gatekeeper further comprises identifying the gatekeeper from the plurality of different gatekeepers based on a superordinate and subordinate relationship between the gatekeeper and the requester.

4. The method of claim 3 wherein the superordinate and subordinate relationship is specified in a relationship graph.

5. The method of claim 3, wherein the superordinate and subordinate relationship is between an organizer of a gathering and attendees of the gathering.

6. The method of claim 3 wherein the superordinate and subordinate relationship is a teacher and student relationship.

7. The method of claim 3 wherein the superordinate and subordinate relationship is a familial relationship.

8. The method of claim 3 wherein the superordinate and subordinate relationship is a relationship between a driver of a vehicle and a passenger in the vehicle.

9. The method of claim 2, wherein the identified one or more attributes is the current time and the media renderer is located in an assembly room and based on the attribute being the current time and the media renderer, identifying the gatekeeper further comprises identifying the gatekeeper from the plurality of different gatekeepers based on an assembly scheduled for the assembly room at the current time.

10. The method of claim 2, wherein the identified one or more attributes is the identification of the requesting device and based on the attribute being the identification of the requesting device, identifying the gatekeeper further comprises identifying the gatekeeper from the plurality of different gatekeepers based on a person in control of the requesting device.

11. The method of claim 1, wherein the identified gatekeeper is a person and the notification is sent to a device associated with that person.

12. The method of claim 1, wherein the identified gatekeeper is a gatekeeper engine that enforces a policy for casting media to the media renderer.

13. The method of claim 1, further comprising:
determining that another device is currently casting media to the media renderer when the request is received and based on the determination that another device is currently casting media to the media renderer, allowing the requesting device to cast the media to the media renderer further comprises causing casting of the current media to be stopped and the casting of the requested media to be started.

14. The method of claim 1, further comprising:
determining that another device is currently casting media to the media renderer when the request is received and based on the determination that another device is currently casting media to the media renderer, queuing the request, wherein the queue is to cause the request to be allowed after the casting of the current media stops.

15. The method of claim 1, wherein the requesting device is a source of the media to be cast.

16. The method of claim 1, wherein a device other than the requesting device is a source of the media to be cast.

17. The method of claim 1, further comprising:
determining that another device is currently casting media to the media renderer and based on the determination that another device is currently casting media to the media renderer and the request being granted, mixing the current media and the media of requesting device and rendering the mixed media.

18. The method of claim 17, wherein the media of the requesting device is an announcement that is mixed with the current media.

19. The method of claim 1, further comprising:
not receiving an indication to grant or deny the request from the gatekeeper; and
based on the indication to grant or deny the request not being received from the gatekeeper, notifying another gatekeeper that the request has been received.

20. A casting control system comprising:
a processor: and one or more non-transitory computer-readable storage media storing computer-executable instructions that when executed by the processor, cause the processor to:
receive from a requesting device a request to cast to a media renderer; and
in response to receipt of the request,
identify one or more attributes associated with the request;
based on the identified one or more attributes associated with the request,
identify a gatekeeper from a plurality of different gatekeepers for the media renderer;
coordinate with the identified gatekeeper to determine whether to allow or deny the request; and
allow or deny the requesting device to cast the media to the media renderer based on the determination to allow or deny the request.

21. The casting control system of claim 20, wherein the non-transitory computer-executable instructions include instructions that are to cause the processor to determine that another device is currently casting to the media renderer and based on the determination that the requested casting is allowed, terminate the casting of the another device.

22. The casting control system of claim 20, wherein the one or more attributes comprises a current time, an identification of the requesting device, and an identification of a requester associated with the requesting device, and wherein the non-transitory computer-executable instructions are further to cause the processor to identify the gatekeeper from the plurality of different gatekeepers for the media renderer based on at least one of the current time, the identification of the requesting device, and the identification of the requester associated with the requesting device.

23. One or more non-transitory computer-readable storage media storing computer-executable instructions that, when executed by a processor of a media renderer, cause the media renderer to:
detect an attempt by a device to cast to the media renderer; and
in response to the attempt being detected,
determine whether another device is currently casting to the media renderer, based on a determination that another device is not currently casting to the media renderer, allow the device to cast to the media renderer; and based on a determination that another device is currently casting to the media renderer,
identify a gatekeeper for the media renderer;
notify the gatekeeper that an attempt has been received to cast to the media renderer,
receive from the gatekeeper an indication to grant or deny the casting;
based on the casting being granted, allow the device to cast media from the device to the media renderer even if another device is currently casting to the media renderer; and
based on the casting being denied, not allow the device to cast to the media renderer.

\* \* \* \* \*